Patented Dec. 14, 1948

2,456,051

UNITED STATES PATENT OFFICE 2,456,051

N'-DODECANOYLSULFANILAMIDES

Martin E. Hultquist and Elmore H. Northey, Bound Brook, N. J., assignors to American Cyanamid Company, New York, N. Y., a corporation of Maine No Drawing. Application December 15, 1944, Serial No. 568,386

2 Claims. (Cl. 260—397.7)

This invention relates to nitro or amino substituted phenylene N-acylsulfonamides, particularly N¹-acylsulfanilamides, and to methods of preparing them.

The present invention is directed to a new class of chemical compounds which are useful as azo dye intermediates and which show varying degrees of therapeutic action against streptococci and similar bacteria. The compounds of the present invention may be represented by the following formula:

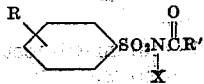

in which R is an amino group or group hydrolyzable or reducible to an amino group such as nitro, acylamino, etc. R' is an alkyl group containing more than 1 and not more than 12 carbon atoms. X is hydrogen, alkyl, or a salt forming metal.

When R is amino and is in the para position, the compounds, which may be considered as N¹-acylsulfanilamides, are of high bacteriostatic action against many bacteria, such as streptococci, pneumococci and the like. These compounds show a striking improvement in activity not only over sulfanilamide but also over N¹-acetylsulfanilamide. The activity remains very high up to compounds in which R¹ has 11 carbon atoms. Thereafter the activity drops sharply and when it reaches 15, the activity is less than N¹-acetylsulfanilamide. It is not known why the activity falls off so quickly with increasing length of carbon chain, and it is not desired to limit the invention to any theory. It is probable, however, that when the molecule becomes too large, absorption difficulties are encountered.

While the compounds of the present invention are not limited to any particular process, we have found that when R is an acylamino group having the same acyclic acid radical as is attached to the N¹ nitrogen, the compound may be prepared by reacting the corresponding aminosulfonamide such as sulfanilamide with an excess of the acid chloride, preferably in the presence of a tertiary base such as pyridine. The reaction may also be effected by dry fusion of the acid chloride and the sulfonamide or by reaction of the acid chloride and sulfonamide in the presence of an inert solvent with prolonged heating.

Unsymmetrical diacylaminobenzenesulfonamides are prepared from the corresponding (acylamino) benzenesulfonamides by reaction with the desired acid chloride in the presence of pyridine or by prolonged heating in an inert solvent; or by reaction with excess of the acid anhydride. Another method is by reacting the dry sodium salt of the (acylamino) benzenesulfonamide with the acid chloride, preferably in the presence of an inert solvent or tertiary amine. The preferred method of synthesis, however, is that according to the following equation, using N⁴-acetylsulfanilamide as the (acylamino) benzenesulfonamide in question:

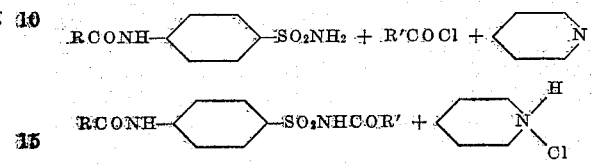

Since the free N¹-acylsulfanilamides are usually the most effective therapeutic agents, the N¹,N⁴-diacylsulfanilamides prepared as outlined above are hydrolyzed, preferably by boiling with aqueous sodium or potassium hydroxide. This gives the N¹-sodium salt of the N¹-acylsulfanilamide which can be acidified to form the free N¹-acylsulfanilamide.

These procedures are entirely general and can be applied to the preparation of other N-acylsulfonamides of the present invention; i. e., by substituting metanilamide for sulfanilamide, a N¹-acylmetanilamide may be prepared. Meta derivatives may also be prepared by reduction of N¹-acyl-m-nitroarylsulfonamides, and these preparations are also included within the scope of the present invention.

The compounds of the present invention vary in their properties. The lower member of the series, such as the propionyl and butyryl derivatives, are moderately soluble in water while higher members are insoluble in water but soluble in fat. Practically all of the N¹-acylsulfanilamides are soluble in alcohol and more so when there is a trace of water present.

The invention will be described in greater detail in conjunction with the following specific examples which are illustrative only and not intended to limit the scope of the invention. Parts are by weight.

*Example 1*

N¹,N⁴-diacetylsulfanilamide

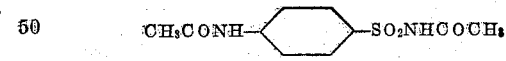

To 500 grams of acetic anhydride heated to a temperature of 70°–80° C., 172 grams of sulfanilamide were added gradually with agitation. Considerable heat was involved so that cooling was necessary. After all the sulfanilamide had been added the solution was maintained at a boil for 45 minutes. A heavy crop of crystals was removed and a second crop obtained on cooling. The second crop was found to consist of a mixture of $N^4$-acetylsulfanilamide and the desired product whereas the first crop was practically pure diacetyl compound. On recrystallization from 50% alcohol in which $N^1,N^4$-diacetylsulfanilamide is soluble to the extent of about 4.5% hot, a material melting at 253.5°–255° C. with decomposition was obtained. A compound described as diacetylsulfanilamide but without any assigned structure was described by Scudi (Ind. Eng. Chem. analytical edition, page 346, 1938). The material obtained by Scudi, however, was said to melt at 240°–242° C. This titrated by caustic for a purity of 99.5% calculated for a theoretical equivalent weight of 256.3. $N^1,N^4$-diacetylsulfanilamide forms a very soluble sodium salt which is neutral.

$N^1$-acetylsulfanilamide

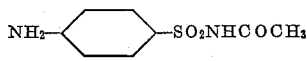

2.25 equivalents of sodium hydroxide per mol of diacetylsulfanilamide dissolved in 700 cc. of solution were added to the $N^1,N^4$-diacetylsulfanilamide prepared as described above and the solution was boiled for 1 hour. It was then neutralized to about pH 9 with hydrochloric acid and treated with activated charcoal while warm. On cooling and standing, a little sulfanilamide crystallized out and was removed. The solution was acidified to about pH 4 with hydrochloric acid and $N^1$-acetylsulfanilamide containing a little $N^1,N^4$-diacetylsulfanilamide crystallized on cooling. The mixture was warmed to 40°–50° C. with 10% hydrochloric acid in which the $N^1$-acetylsulfanilamide was soluble while the diacetylsulfanilamide remained undissolved and was removed by filtration. The filtrate was treated with decolorizing carbon, then neutralized to about pH 4 with sodium hydroxide solution. The $N^1$-acetylsulfanilamide crystallized on cooling. This was recrystallized from hot water in which it is soluble about 7% at the boil, but only about 0.9% at room temperature. Melting point of this material was 180.5°–182.0° C. Assay by nitrite was 100.0% while by sodium hydroxide it was 100.5% to a phenolphthalein end-point, calculated for theoretical molecular weight of 214.3.

*Example 2*

$N^1$-propionyl-$N^4$-acetylsulfanilamide

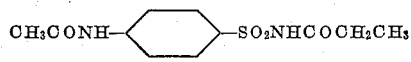

214 grams of dry $N^4$-acetylsulfanilamide were suspended in 200 cc. of pyridine bases having a boiling range of 145°–150° C. To this was added 92.5 grams of propionyl chloride over about 30 minutes with cooling, so as to hold down the temperature below 50° until towards the end when it was allowed to warm up to 60° C. A dark brown solution was finally obtained which was warmed at 60° for an additional 30 minutes. The mixture was then poured into a liter of cold water containing 200 cc. of hydrochloric acid. The resulting crystalline precipitate was filtered off and washed with water. This was dissolved in a liter of water with addition of sodium hydroxide to a pH of about 9. It was treated with decolorizing carbon and then reprecipitated by adding hydrochloric acid. The precipitate was washed well with water and then recrystallized twice from 80% alcohol using decolorizing carbon. The compound was only slightly soluble in hot alcohol so that large volumes were necessary. Resulting $N^1$-propionyl-$N^4$-acetylsulfanilamide assayed 99.9% pure (calculated to equivalent weight 270.2) by titration with N/10 sodium hydroxide. Melting point was 134°–135° C.

$N^1$-propionylsulfanilamide

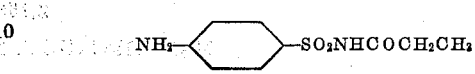

The acetyl group was hydrolyzed off by boiling 1 mol of the $N^1$-propionyl-$N^4$-acetylsulfanilamide with 2.25 equivalents of sodium hydroxide in 750 cc. of water for 1½ hours. The mixture was acidified to about pH 9 with hydrochloric acid, treated with decolorizing carbon, cooled, and a crop of sulfanilamide filtered off. The filtrate was acidified to about pH 4 and the crude $N^1$-propionylsulfanilamide crystallized on cooling. It was filtered off and recrystallized from water, using decolorizing carbon. Solubility at room temperature was 0.7%. The assay by nitrite was 100.0%. Assay by N/10 sodium hydroxide was 100.1% to a phenolphthalein end-point. Calculated for theoretical molecular weight of 228.3. Melting point was 134°–135° C.

*Example 3*

$N^1$-butanoyl-$N^4$-acetylsulfanilamide

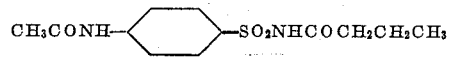

Anhydrous $N^1$-sodium-$N^4$-acetylsulfanilamide was prepared as follows: crude $N^4$-acetylsulfanilamide paste as obtained in sulfanilamide manufacture was dissolved by the addition of solid, powdered sodium hydroxide to form a warm solution of the $N^1$-sodium-$N^4$-acetylsulfanilamide. This was treated with decolorizing carbon, then cooled and crystallized, when it formed large crystals containing much water of crystallization which were filtered and washed with a little ice water. These crystals were melted in a small amount of water and recrystallized to free from excess caustic. As much of the adhering mother liquor was removed as possible by filtration and the crystals were then dried in a vacuum oven at not over 50° C. until practically anhydrous, then at 60°–70° C. until completely anhydrous, as indicated by hydrolysis of a sample to sulfanilamide and titration with nitrite. The resulting anhydrous material was finely ground and used for the following synthesis:

236 grams of 1 mol of the $N^1$-sodium-$N^4$-acetylsulfanilamide were suspended in 400 cc. of anhydrous dioxane. 108 grams of butanoyl chloride or 1 mol was added under agitation and when the reaction moderated, heat was applied to maintain a slow boiling for 3 hours under reflux condenser. The product was practically insoluble in the dioxane and was removed by filtration. It was recrystallized twice from 2 liters of 70% alcohol using decolorizing carbon. Melting point was 238.2°–240° C. Assay by sodium hydroxide was 98.4%. Crystals were needle shaped.

$N^1$-butanoylsulfanilamide

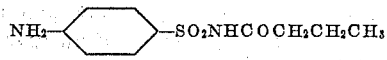

Hydrolysis of the acetyl group was accomplished by the same procedure as used in Example 2. The product was recrystallized from water using decolorizing carbon. It was soluble about 1½% near the boil. Assay by sodium hydroxide titration, 100.2%; assay by nitrite titration, 100.6%. Theoretical molecular weight was 242.3. Melting point was 116.1°–117.3° C. Crystals were in the form of long prisms.

Example 4

$N^1$-hexanoyl-$N^4$-acetylsulfanilamide

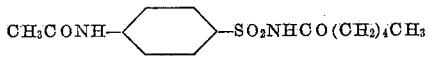

1 mol of $N^1$-sodium-$N^4$-acetylsulfanilamide was suspended in 500 cc. of xylene and heated to 100° C. 136 grams of hexanoyl chloride were added under agitation. The mixture was warmed to 125°–135° C. and held for 3 hours. While still warm, the pasty reaction mixture was transferred to a liter of water and the product dissolved by addition of sodium hydroxide. The layer of xylene was separated, then the solution was treated with decolorizing carbon and acidified. The product was obtained as waxy pellets. It was recrystallized three times from about 600 cc. of 40% alcohol, using decolorizing carbon. Melting point was 191°–193° C. Equivalent weight by sodium hydroxide was 101.0%.

$N^1$-hexanoylsulfanilamide

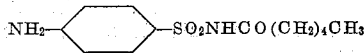

The acetyl group was hydrolyzed off as in Example 2. Crude product was recrystallized from 60% alcohol using decolorizing carbon. After three recrystallizations the material had a melting point of 129.2°–129.9° C. Assay by sodium hydroxide was 100% and by sodium nitrite was 99.5%. Product crystallized in long prisms.

Example 5

$N^1$-(2-ethylbutanoyl)-$N^4$-acetylsulfanilamide

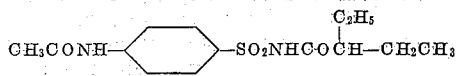

$N^1$-(2-ethylbutanoylsulfanilamide)

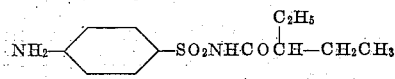

These compounds were prepared by the procedure of Example 2, substituting an equivalent amount of 2-ethylbutanoyl chloride in place of propionyl chloride. The crude $N^1$-(2-ethylbutanoyl)-$N^4$-acetylsulfanilamide was recrystallized from 80% alcohol. It crystallized in the form of rectangular plates, melting 189°–193° C. The assay by sodium hydroxide was 99.5%.

Example 6

$N^1$-(2-ethylhexanoyl)-$N^4$-acetylsulfanilamide

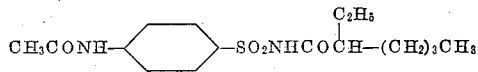

236 grams or 1 mol of dry $N^1$-sodium-$N^4$-acetylsulfanilamide and 162 grams or 1 mol of 2-ethylhexanoyl chloride were added in alternate portions to 400 cc. of pyridine with agitation and cooling over about 20 minutes. The mixture was warmed to 100° C. at the end for 30 minutes and then the reaction mixture was drowned in cold water containing excess hydrochloric acid. The crude product crystallized, was filtered off, and recrystallized from about 70% alcohol, using decolorizing carbon. The product melted at 214°–215.6° C. and assayed by sodium hydroxide 99.8% pure. Calculated molecular weight was 340.4. The product crystallized as prisms.

$N^1$-(2-ethylhexanoyl)-sulfanilamide

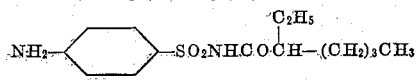

The $N^4$-acetyl group was hydrolyzed by the method of Example 2. The crude $N^1$-(2-ethylhexanoyl)sulfanilamide was purified by recrystallization from 70% alcohol. It crystallized in prisms melting at 165.5°–168.0° C. Assay by sodium hydroxide, 99.2%; by nitrite, 97.8% calculated on theoretical molecular weight of 298.4.

Example 7

$N^1$-dodecanoyl-$N^4$-acetylsulfanilamide

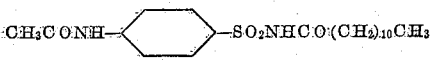

214 grams of dry $N^4$-acetylsulfanilamide and 219 grams of dodecanoyl chloride (1 mol) having a boiling range of 110°–113° C. at 7 mm. were added in portions to 300 cc. of pyridine bases (boiling range 120°–140° C.). Temperature was maintained at 40° C. during the first part of the reaction, then allowed to warm to 60° C. at the end. The addition of the $N^4$-acetylsulfanilamide was kept well ahead of the dodecanoyl chloride. Total time of addition was ¾ hour. The temperature was raised at the end to 85°–90° C. and held for 1 hour. The mixture was drowned in 330 cc. of concentrated hydrochloric acid in 1 liter of warm water under agitation. The resulting soft pellets of product were filtered and washed well with water. A portion of the crude material was dissolved at approximately pH 9 in aqueous solution with sodium hydroxide. The solution was treated with decolorizing carbon and the product reprecipitated by acidification. On recrystallizing twice from 80% alcohol, $N^1$-dodecanoyl-$N^4$-acetylsulfanilamide was obtained assaying 99.1% pure by sodium hydroxide and melting at 130°–136° C.

$N^1$-dodecanoylsulfanilamide

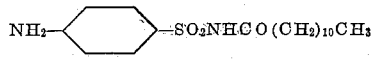

The main portion of the crude material was hydrolyzed as in Example 2. The crude product from acidification of the hydrolysis liquor was recrystallized five times from 800 cc. of toluene, using decolorizing carbon, then once from 80% alcohol. The resulting $N^1$-dodecanoylsulfanilamide assayed 100% pure by sodium hydroxide, and 100% pure by sodium nitrate titration (after boiling with alcoholic hydrochloric acid) calculated for theoretical molecular weight 354.5. Melting point was 127°–128.5° C. Product crystallized in elongated prisms or needles.

When $N^1$-dodecanoylsulfanilamide was prepared on a technical scale, important savings resulted by eliminating the isolation of the $N^1$-dodecanoyl-$N^4$-acetylsulfanilamide. After the condensation reaction was over, 3.25 moles of sodium hydroxide (in the form of a 20% solution) per mole of $N^4$-acetylsulfanilamide was added to the reaction mixture. The mixture was boiled and a pyridine-water mixture distilled. (Pyridine was recovered from this by treatment with sodium hydroxide and distillation of the dried pyridine.) The volume was maintained constant by addition of water at the same rate as the condensate collected. Distillation was necessarily somewhat slow since the mixture had a tendency to foam. When no more pyridine was obtained from the distillate, the mixture was neutralized to approximately pH 9.5 by addition of hydrochloric acid, treated with activated charcoal and the crude product precipitated by acidification to pH 3-4. It was purified as described above. The purity of the crude material was apparently not impaired by eliminating the intermediate steps.

By a similar procedure using equivalent amounts of the corresponding acid chloride instead of dodecanoyl chloride, the following derivatives were made: $N^1$-octanoyl-$N^4$-acetylsulfanilamide; $N^1$-octanoylsulfanilamide; $N^1$-decanoyl-$N^4$-acetylsulfanilamide; $N^1$-decanoylsulfanilamide.

The greatly increased in vivo activity of $N^1$-dodecanoylsulfanilamide over sulfanilamide instead is shown by the following pharmacological test. A series of mice of the standard Swiss strain of white mice weighing between 10-12 g. were infected by intraperitoneal $1 \times 10^{-6}$ cc. of a 16-hour culture of the C-203 strain of beta hemolytic streptococci obtained from the Johns Hopkins Hospital. The mice were divided into four groups, A, B, C and D. Group A consisted of 100 mice which were used as untreated controls. Group B contained 250 mice which received 1 cc. of a 1% acacia suspension of sulfanilamide, per orally, 1 hour and 24 hours after infection. Group C contained 200 mice which received 1 cc. of 1% olive oil solution of $N^1$-dodecanoylsulfanilamide administered orally 1 hour and 24 hours after infection. Group D contained 100 mice which were treated with the same amount of $N^1$-dodecanoylsulfanilamide but administered in a mixture of milk and olive oil. The percentage of mortality is shown by the following table:

| Group | Per cent Mortality at— | | | | |
| --- | --- | --- | --- | --- | --- |
| | 12 hr. | 24 hr. | 48 hr. | 72 hr. | 96 hr. |
| A | 26 | 100 | | | |
| B | 0 | 2 | 8 | 10 | 16 |
| C | 0 | 0 | 2 | 4 | 4 |
| D | 0 | 1 | 1 | 1 | 1 |

*Example 8*

$N^4$-sodiumformaldehydesulfoxalate derivative of $N^1$-dodecanoylsulfanilamide

A mixture of 36 parts $N^1$-dodecanoylsulfanilamide, 15 parts of sodium formaldehyde sulfoxalate and 100 parts of water were warmed under agitation on the water bath for 30 minutes, when almost complete solution was obtained. On standing, a slight excess of $N^1$-dodecanoylsulfanilamide separated into a foamy layer. The bottom layer of clear solution was separated. It was evaporated to dryness in vacuo in thin layers at room temperature. The resulting compound was extremely soluble in water and exhibited the properties of a soap. Its aqueous solution had a pH slightly less than 7. By titration with sodium hydroxide to a phenolphthalein end-point, 1 equivalent of sodium hydroxide was neutralized per mole, giving an assay of 99.9%. The product decomposes indefinitely above 200° C.

*Example 9*

$N^1$-sodium-$N^1$-(2-ethylhexanoyl)-$N^4$-acetylsulfanilamide

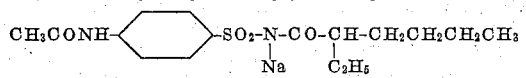

0.1 mol of $N^1$-(2-ethylhexanoyl)-$N^4$-acetylsulfanilamide was dissolved in 50 cc. alcohol containing 0.1 mole NaOH—adjustment was made so that a spot of the solution did not show pink on wet phenolphthalein paper. The solution was then evaporated to dryness and held at 115°-120° C. for 24 hours. An amorphous product was obtained which analyzed 100.5% pure for a calculated molecular weight of 362.4 (sample was hydrolyzed with 70% $H_2SO_4$, then titrated with nitrite). Extremely soluble in both water and alcohol.

$N^1$-magnesium-$N^1$-(2-ethylhexanoyl)-$N^4$-acetylsulfanilamide

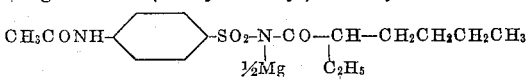

0.1 mole of $N^1$-(2-ethylhexanoyl)-$N^4$-acetylsulfanilamide was suspended in a mixture of 200 cc. methanol and 200 cc. water. Excess finely divided magnesium metal was added and the mixture boiled under a reflux condenser for 1½ hours during which time hydrogen was evolved. The methanol was boiled off and the mixture clarified to remove excess magnesium. The clarified liquor was evaporated to dryness in the oven giving a glassy solid. This was ground and redried. A sample of this on acidification gave $N^1$-(2-ethylhexanoyl)-$N^4$-acetylsulfanilamide of only slightly lower melting point than the original, indicating no change in organic structure by treatment with magnesium metal.

Analysis for magnesium gave 3.35%; theoretical, 3.46% for calculated molecular weight of 703.18.

$N^1$-silver-$N^1$-dodecanoylsulfanilamide

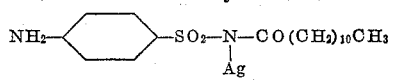

0.1 mole $N^1$-dodecanoylsulfanilamide was dissolved in 2.5 liters of alcohol and treated at the boil with the freshly precipitated silver oxide from 15 grams of silver nitrate, for ½ hour. The mixture was clarified while hot. On cooling, crystals of the salt crystallized, were filtered off, and washed with alcohol. Assay by nitrite (after boiling the sample four hours with alcoholic hydrochloric acid) was 99.2% for a calculated molecular weight of 461.4. The salt decomposes indefinitely above 150° C., giving a silvery surface.

$N^1$-mercuric-$N^1$-dodecanoylsulfanilamide

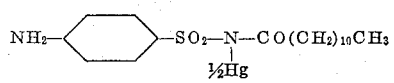

To 0.1 mole $N^1$-dodecanoylsulfanilamide dissolved in 300 cc. of alcohol and neutralized with sodium hydroxide, there was added at the boil 0.1 equivalent of mercuric chloride dissolved in 300 cc. of hot alcohol. On cooling a mixture of sodium chloride and $N^1$-mercuric-$N^1$-dodecanoylsulfanilamide crystallized, was filtered off, and washed with alcohol. The mixture was recrystallized from 1 liter of hot acetone in which the desired salt was soluble while sodium chloride was insoluble. The product crystallized as clusters of needles which melted with decomposition at 235°-240° C.

$N^1$-calcium-$N^1$-dodecanoylsulfanilamide

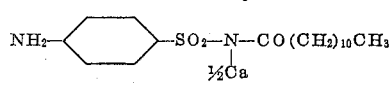

0.1 mole $N^1$-dodecanoylsulfanilamide was suspended in 500 cc. of water and treated at the boil with an excess of freshly prepared calcium hydroxide. The mixture was filtered while hot but only a slight amount of product was obtained on cooling the filtrate, showing that the calcium salt was only slightly soluble even in hot water. The residue was digested with hot alcohol and the excess lime filtered off. On cooling the alcoholic liquor, the calcium salt crystallized in long needles which melted above 300° C. with decomposition. The salt was insoluble in toluene and anhydrous acetone but appeared to be moderately soluble in 60%–80% acetone.

The salt was also made by adding 0.1 equivalent of calcium acetate solution to a hot solution of 0.1 mole of $N^1$-sodium-$N^1$-dodecanoylsulfanilamide in 1 liter of water. The heavy precipitate of the calcium salt was filtered off, then recrystallized from 1 liter of alcohol. It analyzed (after hydrolysis with 70% sulfuric acid) by nitrite titration for an equivalent weight of 372.5; theoretical, 373.3.

*Example 10*

$N^1$-butyl-$N^1$-hexanoyl-3-nitrobenzenesulfonamide

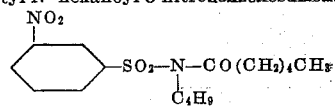

To 90 grams (0.35 mole) $N^1$-butyl-3-nitrobenzenesulfonamide in 200 cc. dry pyridine was added 47 grams (0.35 mole) hexanoyl chloride. The temperature rose to 80° C. and a dark brown solution resulted. This was heated to 95°–100° C. for 20 minutes.

The solution was drowned in 500 cc. water and acidified with 200 cc. concentrated hydrochloric acid. The heavy, water-insoluble liquid was washed with water, 10% sodium hydroxide solution, and finally with water in a separatory funnel. The product crystallized solid on standing for a few hours; it was recrystallized once from a mixture of hexane and benzene and a second time from a mixture of ether and hexane to give pale yellow needles melting at 52°–53.5° C. This compound when analyzed was found to contain 7.98% nitrogen; theory 7.86.

$N^1$-butyl-$N^1$-hexanoylmetanilamide

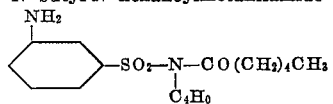

To a mixture of 112 grams iron powder, 300 cc. water and 3 cc. glacial acetic acid stirred vigorously at 90°–95° C. was added 89.2 grams (0.25 mole) $N^1$-butyl-$N^1$-hexanoyl-3-nitrobenzenesulfonamide dissolved in 100 cc. toluene. The mixture was held at reflux for 2 hours, sodium carbonate solution was added to bring the pH of the solution to about 9, and then the mixture was filtered and the sludge washed with toluene.

The toluene layer was evaporated to give a non-crystalline mass. This was dissolved in 200 cc. alcohol and the solution was clarified. Sodium hydroxide was added to make the solution alkaline to benzoazurine, and this solution was poured into 500 cc. 2% sodium hydroxide solution to hold in solution any caustic soluble metanilamide derivatives. The heavy, sirupy product was washed well with water and dried at 100° C. to give a light brown, clear, non-crystalline oil. A sample titrated with nitrite after hydrolysis with 70% sulfuric acid showed a purity of 101.2% for a calculated molecular weight of 326.5.

In the examples, $N^4$-acetylsulfanilamide has been used in each case as the starting material because it is cheap and readily available. It should be understood, however, that the invention is not limited to the use of $N^4$-acetylsulfanilamide and any other acyl derivative such as formyl, propionyl, benzoyl, and the like, may be substituted for the acetyl derivative.

The accompanying table summarizes the principal properties of typical $N^1$-acylsulfanilamides included in the present invention.

The remarkable difference in activity between $N^1$-acetylsulfanilamide and those in which the acyl radical is of an aliphatic acid containing more than 2 and not more than 13 carbon atoms are shown by the following table which gives toxicity and activity against streptococci and pneumococci. In every case the drug was administered as a suspension in oil and control animals were used to assure the virulence of the bacteria used. The controls, of course, died. The table is based on the following group formula:

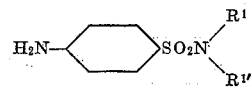

*Table*

| $R^1$ | $R^{1\prime}$ | Toxicity L. D. 50 g./kg. | In Vivo Per Cent Average Survival | |
|---|---|---|---|---|
| | | | Strep. | Pneumo. |
| $CH_3CO-$ | H | >10 | 47 | 36 |
| $C_2H_5CO-$ | H | 5–10 | 73 | 28 |
| $CH_3(CH_2)_2CO-$ | H | >10 | 80 | 25 |
| $CH_3(CH_2)_3CO-$ | H | 2–5 | 66 | 43 |
| $CH_3(CH_2)_4CO-$ | H | | 61 | 54 |
| $CH_3(CH_2)_5CO-$ | H | >10 | 58 | 36 |
| $CH_3(CH_2)_6CO-$ | H | >10 | 67 | 61 |
| $CH_3(CH_2)_8CO-$ | H | >10 | 68 | 19 |
| $CH_3(CH_2)_{10}CO-$ | H | >10 | 70 | 37 |
| $CH_3(CH_2)_{16}CO-$ | H | 10 | 41 | 7 |

This is in part a continuation of our copending application Serial No. 259,382, filed March 2, 1939, which has become abandoned.

*$N'$-acylsulfanilamides*

| $N^1$-Acyl Radical | Molecular Weight | Assay by NaOH, Per cent | Assay by Nitrite, Per cent | Degrees C. Melting Range | Solubility | Crystalline Form |
|---|---|---|---|---|---|---|
| Propionyl | 228.3 | 100.1 | 99.6 | 134.0–135.0 | s. h. w. mod. s. h. al | Prisms. |
| Butyryl | 242.3 | 100.2 | 100.6 | 116.1–117.3 | recryst. dil. alcohol | Long Prisms. |
| Isobutyryl | 242.3 | 100.2 | 100.5 | 198.5–200.0 | recryst. dil. al | Glistening Prisms. |
| 2-Ethylbutyryl | 270.4 | 99.5 | 97.5 | 189.0–193.5 | recryst. 60% alcohol | Plates. |
| Hexanoyl | 270.4 | 100.0 | 99.5 | 129.2–129.9 | do | Long Prisms. |
| Heptanoyl | 284.4 | 99.7 | 99.7 | 121.8–123.6 | do | Hexagonal Prisms. |
| 2-Ethylhexanoyl | 298.4 | 99.2 | 97.6 | 165.5–168.0 | recryst. 70% alcohol | Prisms. |
| Octanoyl | 298.4 | 99.5 | 98.7 | 101.0–103.0 | v. s. h. toluene, ext. s. al. i. w., recryst. 60% alcohol. | Needles from toluene; Fine Prisms from alcohol. |
| Decanoyl | 326.5 | 98.2 | 98.0 | 113–121–122 | v. s. h. toluene, ext. s. al., i. w., recryst. 60% alcohol. | Fine Prisms. |
| Dodecanoyl | 354.5 | 100.0 | 100.0 | [1] 127.0–128.5 | v. s. h. toluene, ext. s. al., i. w., recryst. 60% alcohol. | Plates and Needles. |
| Octadecanoyl [2] | 438.7 | 102.9 | 101.8 | 98.0–102.0 | Recryst. 70% al | Irregular Plates. |

[1] Also exists in a form which starts melting at 115 degrees C., then changes to the higher melting form.
[2] Prepared from stearic acid containing palmitic acid.

$N^1$=acylmetanilamides

| $N^1$-Acyl Radical | Molecular Weight | Assay by NaOH, per cent | Assay by Nitrite, per cent | Degrees C. Melting Range | Solubility | Crystalline Form |
|---|---|---|---|---|---|---|
| Tetradecanoyl | 382.5 | 99.5 | 100.1 | 113.5–114.2 | Recryst. 80% al | Flat Prisms. |

$N^1$, $N^4$-diacylsulfanilamides

| $N^1$-Acyl Radical | $N^4$-Acyl Radical | Molecular Weight | Assay by NaOH, per cent | Degrees C. Melting Range | Solubility | Crystalline Form |
|---|---|---|---|---|---|---|
| Propionyl | Acetyl | 270.3 | 99.9 | 242.5–244.3 | Sl. s. h. al | Prisms. |
| Isobutyryl | ---do--- | 284.3 | 99.5 | 247.0–248.0 | Recryst. 80% al | Needles. |
| Butyryl | ---do--- | 284.3 | 98.4 | 238.2–240.0 | ---do--- | Do. |
| Valeryl | ---do--- | 298.3 | 100.0 | 215.0–217.5 | ---do--- | Rectangular Plates. |
| 2-Ethylbutyryl | ---do--- | 312.4 | 99.5 | 270.0–272.0 | ---do--- | Do. |
| Hexanoyl | ---do--- | 312.4 | 98.9 | 191.0–193.0 | Recryst. 60% al | Prisms. |
| Heptanoyl | ---do--- | 326.4 | 100.0 | 205.0–207.5 | ---do--- | Do. |
| 2-Ethylhexanoyl | ---do--- | 340.4 | 99.8 | 214.0–215.6 | ---do--- | Do. |
| Octanoyl | ---do--- | 340.4 | 99.3 | 195.0–197.6 | Recryst. 50% al | Long Prisms. |
| Decanoyl | ---do--- | 368.5 | 99.4 | 134.5–137.0 | Recryst. 70% al | Irregular Plates. |
| Dodecanoyl | ---do--- | 396.5 | 99.1 | 130.0–136.0 | Recryst. 95% al | Do. |
| Dodecanoyl | Dodecanoyl | 536.5 | [1] 100.4 | 144.0–145.0 | ---do--- | Flat Prisms. |

[1] Nitrite.

We claim:
1. $N^1$ - dodecanoylsulfanilamide having the formula:

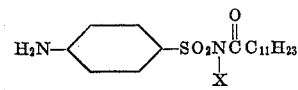

in which X is a cation.

2. $N^1$ - dodecanoylsulfanilamide having the formula:

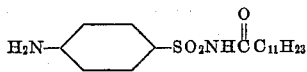

MARTIN E. HULTQUIST.
ELMORE H. NORTHEY.

REFERENCES CITED

The following references are of record in the file of this patent:

FOREIGN PATENTS

| Number | Country | Date |
|---|---|---|
| 11,230 | Australia | Aug. 22, 1940 |

OTHER REFERENCES

Crossley et al., Jour. Am. Chem. Soc., vol. 61, pp. 2950–55, 1939. (Copy in Patent Office Library.)

Curtius, Jour. Prak. Chem., vol. 112 (N. S.), pp. 120–137, 1926. (Copy in Patent Office Library.)